United States Patent
Lien

(10) Patent No.: US 9,649,591 B2
(45) Date of Patent: May 16, 2017

(54) METHOD AND SYSTEM FOR PRODUCING PIPELINE QUALITY NATURAL GAS

(71) Applicant: Larry Lien, Solana Beach, CA (US)

(72) Inventor: Larry Lien, Solana Beach, CA (US)

( * ) Notice: Subject to any disclaimer, the term of this patent is extended or adjusted under 35 U.S.C. 154(b) by 175 days.

(21) Appl. No.: 14/609,565

(22) Filed: Jan. 30, 2015

(65) Prior Publication Data

US 2015/0217224 A1 Aug. 6, 2015

Related U.S. Application Data

(60) Provisional application No. 61/934,077, filed on Jan. 31, 2014.

(51) Int. Cl.
| | |
|---|---|
| *B01D 53/22* | (2006.01) |
| *C10L 3/10* | (2006.01) |
| *B01D 67/00* | (2006.01) |
| *B01D 71/34* | (2006.01) |

(52) U.S. Cl.
CPC ....... *B01D 53/228* (2013.01); *B01D 67/0088* (2013.01); *C10L 3/101* (2013.01); *B01D 71/34* (2013.01); *B01D 2053/221* (2013.01); *B01D 2311/02* (2013.01); *B01D 2315/10* (2013.01); *B01D 2323/46* (2013.01)

(58) Field of Classification Search
None
See application file for complete search history.

(56) References Cited

U.S. PATENT DOCUMENTS

| | | |
|---|---|---|
| 4,639,257 A | 1/1987 | Duckett et al. |
| 4,681,612 A | 7/1987 | O'Brien et al. |
| 4,892,564 A | 1/1990 | Cooley |
| 4,995,888 A | 2/1991 | Beaupre et al. |
| 6,128,919 A | 10/2000 | Daus et al. |
| 6,190,536 B1 * | 2/2001 | Lokhandwala ........... C07C 4/06 208/100 |
| 6,528,214 B1 | 3/2003 | Pliner et al. |
| 7,550,032 B2 | 6/2009 | Brouwers et al. |
| 2004/0099138 A1 | 5/2004 | Karode et al. |
| 2013/0078157 A1 | 3/2013 | Stoimenov et al. |

OTHER PUBLICATIONS

Parkhomei, A.R., et al., "Ceramic Elastically Stiff and Elastically Resilient Semipermeable Membranes," Glass and Ceramics, vol. 65, Nov. 11-12, 2008, pp. 434-435.

* cited by examiner

*Primary Examiner* — Tam M Nguyen
(74) *Attorney, Agent, or Firm* — Honigman Miller Schwartz and Cohn LLP; Jeffrey A. Chelstrom; Jonathan P. O'Brien

(57) ABSTRACT

A method and system for recovering natural gas liquids (NGLs) from hydrocarbon mixtures and for producing a pipeline quality natural gas (NG) stream from a NG stream with a BTU content greater than about 1100 BTU per standard cubic foot. An NG or petroleum gas stream containing NGLs is delivered to a crossflow semipermeable membrane filtration apparatus wherein the semipermeable membrane is wetted with an organic liquid to render the membrane oleophilic. The NG stream is delivered at a pressure of at least about 150 psig. NGLs permeate through the wetted oleophilic membrane at a backpressure of at least 120 psig and maintain the desirable membrane characteristics; they are collected as liquids at a pressure of at least about 15 psig. A pipeline quality, primarily methane retentate stream of not greater than about 1050 BTU/scf is produced.

11 Claims, 2 Drawing Sheets

METHOD AND SYSTEM FOR PRODUCING PIPELINE QUALITY NATURAL GAS

CROSS-REFERENCE To RELATED APPLICATION

This application claims benefit of U.S. Provisional Application No. 61/934,077, filed Jan. 31, 2014, which is hereby incorporated herein by reference in its entirety.

FIELD OF THE INVENTION

This invention relates generally to the production of pipeline quality natural gas (NG). It more particularly relates to methods and systems for removing natural gas liquids (NGLs) or Flare Gas Liquids (FGLs) from streams of natural gas obtained at the wellhead or elsewhere, as well as to removing flare gas components from oil production streams to reduce air pollution. Flare gas streams are very rich in NGLs; as an example, Natural Gas (Dry) may contain 2 gallons of NGLs per minute (gpm) per 1000 cfm, whereas Natural Gas (Wet) may have as much as 4-5 gpm of NGLs. Moreover, flare gas streams from oil production can have 10-15 gpm of liquids, per 1000 cfm of primarily methane, in oil production and refining operations. Recovery of these NGLs would result in only the natural gas needing be flared, assuming there is no economical use for such NG at such location, and this would significantly reduce air pollution. Air pollution from the flares has become a drawback to increased oil production in areas like those of the Bakken formation in North Dakota and Montana, and such removal of FGLs produces a much cleaner flare.

BACKGROUND OF THE INVENTION

As natural gas began to be distributed via pipelines throughout the United States, agencies were variously developed to regulate the specifications of the natural gas that might be transported via pipeline. As experience with pipeline transportation grew, such standards were variously refined, and today in the United States, it is generally accepted that pipeline quality natural gas should not have a BTU content greater than about 1,050 BTUs per standard cubic foot (scf). It is felt that higher BTU contents can cause considerable operational problems and potential equipment damage to pipelines and pipeline step-up compressors, and to end users.

The increase in worldwide natural gas production has resulted in drilling and bringing on stream many gas fields that have a BTU content well above such desired maximum level. Thus, it has become important to be able to treat such streams so as to efficiently and economically reduce the BTU content to the maximum permitted. Although large NG production facilities may have liquefaction equipment available that is suitable for removal of these NGLs, thus far it has not been economical to duplicate such facilities on a much smaller level. Economical and efficient solutions to this problem have been sought for a number of years. In addition, air pollution from oil production flares has become a significant problem as a result of increases in oil production and refining.

SUMMARY OF THE INVENTION

The invention, through the incorporation of semipermeable membrane technology, provides methods and systems for producing pipeline quality natural gas, that are suitable for employment at relatively small-scale production operations, as well as for treating other mixed hydrocarbon streams, including flare gas streams, that contain significant quantities of FGLs/NGLs. It has been found that cross flow semipermeable membrane filtration systems can be effectively used to separate NGLs from a high BTU natural gas stream to produce a pipeline quality natural gas exit stream, as well as from other NG sources, such as petroleum gas (a mixture of hydrocarbons resulting from petroleum refining); moreover, the result includes the effective recovery of liquid NGLs which have economic value. It has been found that a suitable cross flow semipermeable membrane filtration apparatus can be treated so as to render the semipermeable membrane oleophilic, and then operated in a manner to retain the oleophilic properties of the membrane throughout a continuing filtration process.

For example, a semipermeable membrane apparatus may be operated for this purpose at suitably high inlet pressure, e.g. at least about 150 psig, while the backpressure on the permeate side of the cross flow filtration apparatus is maintained at a lower pressure, but one that is at least about 120 psig. The economically valuable NGLs exiting past such a backpressure regulator are preferably recovered in a container maintained at at least about 15 psig (2 atm). Higher operating pressures may be available at many gas fields and may be desired for use in recovering ethane or like hydrocarbons.

In one particular aspect, the invention provides a method for producing a pipeline quality natural gas (NG) stream from a NG stream with a BTU content greater than about 1100 BTU per standard cubic foot (scf), which method comprises providing such a natural gas stream containing natural gas liquids (NGLs), providing a cross flow semipermeable membrane apparatus which has an inlet, a retentate outlet and a permeate outlet, wetting the semipermeable membrane in the cross flow membrane apparatus with an organic liquid to render the membrane oleophilic, delivering said stream at a pressure of at least about 150 psig (11.2 atm) to the inlet of the cross flow apparatus wherein said stream is exposed to said wetted oleophilic membrane, causing NGLs to permeate through said membrane, removing NG retentate from the retentate outlet of the apparatus as a primarily methane stream having a BTU content not greater than 1050 BTU/scf, and collecting permeating liquid NGLs exiting via the permeate outlet while maintaining a backpressure of at least 120 psig (9.2 atm) on the permeate outlet to preserve the oleophilic character of said wetted membrane.

In another particular aspect, the invention provides a method for removing natural gas liquids (NGLs) from a natural gas (NG) stream, which method comprises providing such a natural gas stream containing NGLs, providing a cross flow semipermeable membrane apparatus which has an inlet, a retentate outlet and a permeate outlet, wetting the semipermeable membrane in the cross flow membrane apparatus with an organic liquid to render the membrane oleophilic, delivering said stream at an inlet pressure of at least about 150 psig (11.2 atm) to the inlet of the cross flow apparatus wherein said stream is exposed to said wetted oleophilic membrane, causing NGLs to permeate through said membrane, removing NG retentate from the retentate outlet of the apparatus as a primarily methane stream, and collecting permeating liquid NGLs exiting via the permeate outlet while maintaining a backpressure less than the inlet pressure of at least about 120 psig (9.2 atm) on the permeate outlet to preserve the oleophilic character of said wetted membrane.

In a further particular aspect, the invention provides a system for removing natural gas liquids (NGLs) from a natural gas (NG) stream, which system comprises a cross flow filtration apparatus having a wetted oleophilic semipermeable membrane, an inlet, a retentate outlet and a permeate outlet, provision for delivering a NG stream containing NGLs at an inlet pressure of at least about 150 psig (11.2 atm) to the inlet of the cross flow filtration apparatus wherein it will be exposed to the wetted oleophilic membrane where NGLs will permeate through said membrane, provision for removing an NG retentate from the retentate outlet of the apparatus, a backpressure regulator on the permeate outlet that maintains a backpressure below the inlet pressure but of at least about 120 psig (9.2 atm) on the permeate outlet and thereby preserves the oleophilic character of the wetted membrane while allowing permeating liquid NGLs to exit the apparatus through the permeate outlet, and a collection device for NGLs connected to the permeate outlet, whereby a NG stream which is a primarily methane stream will exit the retentate outlet.

DETAILED DESCRIPTION

Figure 1:
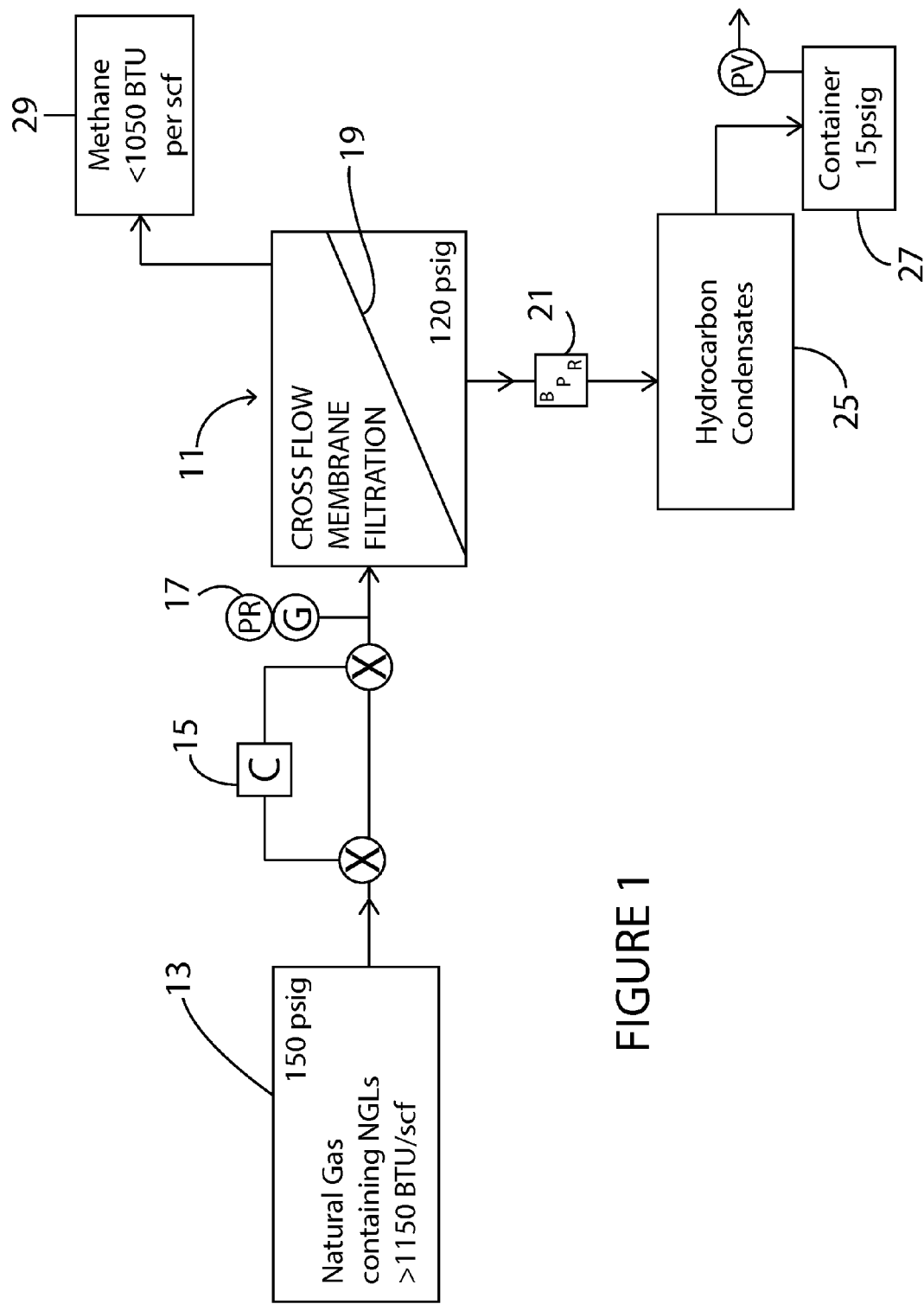
FIG. 1 is a flow sheet illustrating an exemplary treatment of an incoming natural gas stream of high BTU content that is delivered to a cross flow semipermeable membrane filtration device which produces an exit retentate stream of pipeline quality natural gas, comprising mainly methane, and an exit permeate stream of liquid hydrocarbon NGLs.

Natural gas streams being received from wellheads and streams which are found at other stages of NG production operations often contain significant quantities of carbon dioxide ($CO_2$) and NGLs. For purposes of this application, natural gas streams are considered as having at least about 50% methane, and such will generally have 70% or more, and will usually have 80% or more methane. To meet pipeline quality standards, carbon dioxide is often removed via an amine process, as well known in this art, to reduce the $CO_2$ content to or below a maximum pipeline-permissible amount; however, depending on the gas composition in the field at the wellhead, the $CO_2$-depleted stream may still contain significant amounts of NGLs. Such NGLs have independent economic value if they can be efficiently removed from the stream; moreover, if the BTU content of the stream is above about 1,050 BTU/scf in the United States, NGLs must often be removed to lower the BTU value to an acceptable maximum limit before delivery to a pipeline.

It has been found that a cross flow semipermeable membrane filtration apparatus can be effectively employed to not only efficiently produce pipeline quality natural gas, but to simultaneously provide an economic benefit from the value of the liquid hydrocarbons recovered. Generally, any suitable cross flow semipermeable membrane apparatus may be employed, such as those having either spiral wound membranes or hollow fibers, as well as tubular and flat plate membrane apparatus. At the present time, it is felt that spiral wound membrane filtration apparatus may be preferred, particularly for operations at relatively isolated natural gas fields.

The membranes used are any that can be rendered satisfactorily oleophilic, and prospective membranes include both ceramic and polymeric membranes. Among the polymeric membranes, fluorocarbon polymers, such as Teflon (PTFE) and polyvinylidene difluoride (PVDF) may be preferred; however, polysulf ones (PS), including polyethersulf ones (PES), polyimides (PI), polyether ketones (PEK) and thin film polydimethylsiloxanes (PDMS) on a polysulf one base are suitable alternatives. It has been found that such semipermeable membranes can be rendered oleophilic by wetting with an organic liquid material, for example a liquid hydrocarbon, although other organic liquids, e.g. alcohols such as glycerin/glycerol may also be used. An organic liquid is preferably chosen having a viscosity of at least about 4 cps at room temperature that will satisfactorily wet the semipermeable membrane. Generally, the viscosity will not be greater than about 2000 cps at room temperature; for example, wetting with an easily obtainable material petroleum hydrocarbon, such as diesel oil having a cps of about 80, is satisfactory.

It has been found that when, for example, an inlet stream of high BTU natural gas is delivered at a pressure of at least about 150 psig (11.2 atm), and the permeate outlet is equipped with a backpressure regulator set at no less than about 120 psig (9.2 atm), the natural gas stream being fed to the apparatus will have NGLs stripped therefrom by permeation through the oleophilic membrane while at the same time maintaining the oleophilic character of the membrane. Depending upon the particular cross flow filtration apparatus, an inlet pressure as high as about 800 psig (56.2 atm) may be used; however, inlet pressure is generally maintained between about 200 psig (14.1 atm) and 150 psig (10.5 atm). The backpressure is held appropriately less than the inlet pressure, and it is generally accordingly maintained between about 120 and 140 psig. However, in a high pressure operation where it is desired to also recover ethane as a liquid, a collection tank at about 550 psig (38.7 atm) might be employed. The retentate that exits from the apparatus under such conditions is a natural gas stream comprising substantially entirely methane and having a BTU content not greater than about 1,050 BTU/ scf, which should meet pipeline quality standards for the U.S. The permeate stream of hydrocarbon condensates that exits the apparatus at a backpressure of at least about 120 psig may be collected at a suitable pressure. If collected at at least about 15 psig (2 atm), as by drawing it off into a pressurized container where most NGLs will remain liquefied, hydrocarbons having marketable value, i.e. propane, butane, pentane, etc. are obtained. Still higher pressures would permit the recovery of liquid ethane in a high pressure operation.

One embodiment of an illustrated system is depicted in FIG. 1 in the form of a flow sheet which shows the delivery to such cross flow membrane filtration apparatus 11 of an inlet feedstream 13 of natural gas containing NGLs, which might have a BTU content of, for example, about 1,150 BTU/ scf or greater, from which it is desired to produce a pipeline quality gas stream. The stream may, for example, may be at a wellhead pressure of 400 psig, or even higher, and depending upon the apparatus, it may be reduced to about 190 to 150 psig. On the other hand, should the stream pressure be below 150 psig, an auxiliary compressor 15 would be provided so as to raise the pressure to at least about 150 psig. Shown in the drawing is a gauge and pressure regulator 17 at the inlet to the cross flow membrane filtration apparatus 11, which might be set at about 150 psig.

Prior to starting the system, a PVDF semipermeable membrane, spiral wound cartridge 19 in the cross flow filtration apparatus that was selected is wet by pumping diesel fuel having a viscosity of at least 80 cps at room temperature through the filtration apparatus 11 to thoroughly wet the membrane. Before operation of the system begins, a backpressure regulator 21 is set so as to maintain a pressure of about 140 psig on the permeate side of the membrane 19. NGLs in liquefied form will permeate through the membrane as they separate from the incoming natural gas stream 13; as a result of such permeation, the membrane remains wetted and retains its oleophilic character. The permeating NGLs are light hydrocarbon liquids that are received as condensates in a collection or permeate chamber 25 connected to the permeate outlet from the apparatus 11, from which they can be drawn off in liquid form into a pressurized collection container 27 that is maintained at a pressure of at least about 15 psig (2 atm). As a result of this separation of NGLs, a now primarily methane gas stream 29 exits via the retentate exit of the apparatus, which stream has a BTU content of not greater than 1,050 BTU/scf; such is of a quality that can be directly delivered to U.S. pipelines.

Figure 2:
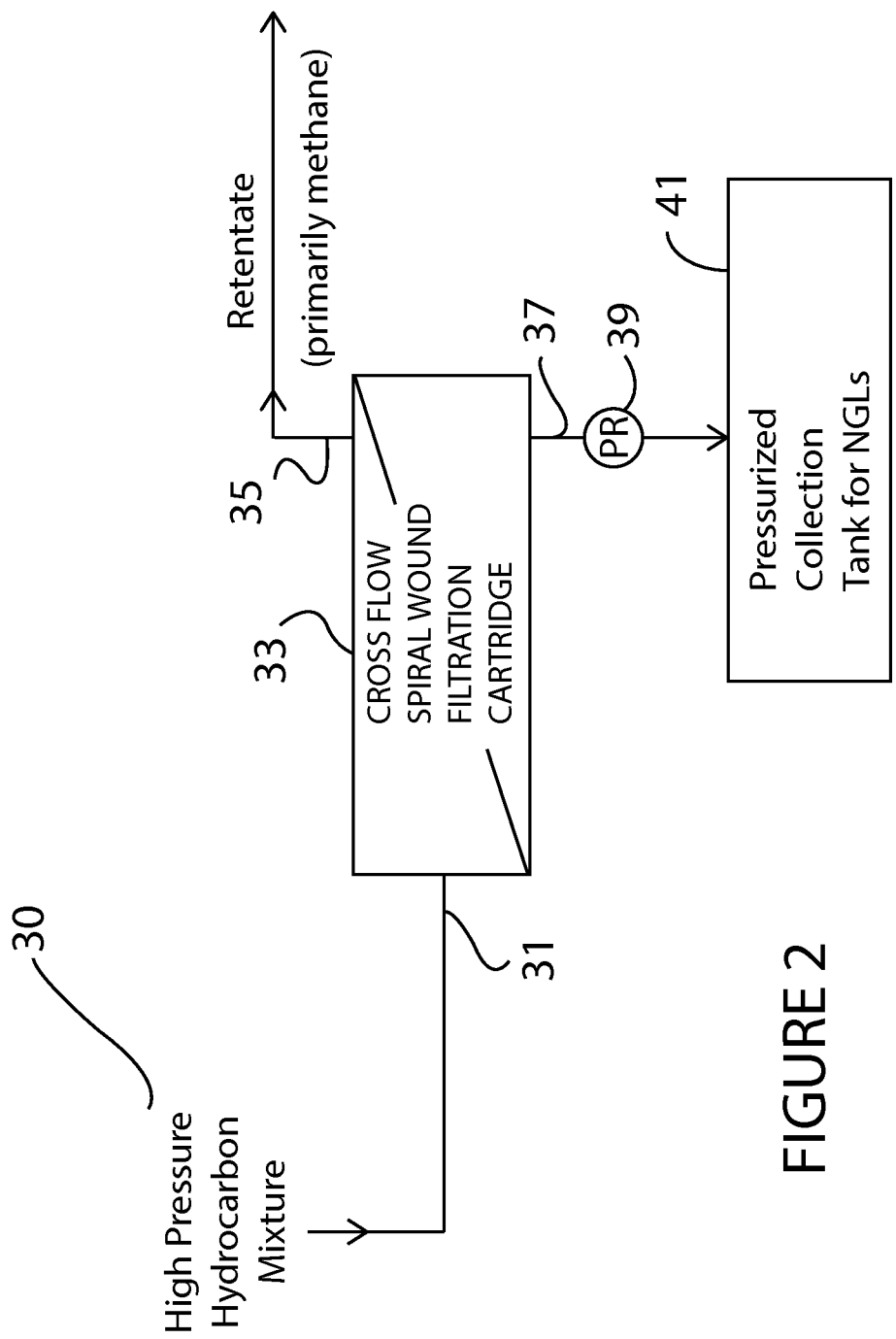
FIG. 2 is a flow sheet illustrating treatment of a high pressure gaseous mixed hydrocarbon stream which produces a permeate of higher hydrocarbon liquids and a primarily methane retentate.

Another embodiment of a separation system is illustrated in FIG. 2 in the form of a flow sheet which contemplates treatment of a pressurized stream of a mixture of hydrocarbons. It may be a stream from a wellhead that comprises a high percentage of methane, or a stream of petroleum gas from a refinery operation, which contains substantial methane along with significant quantities of C2+ hydrocarbons. If such a pressurized stream were at a value of about 800-1000 psi, all of the ethane would remain liquid at normal temperatures and would be generally entrained in the flowing stream; it could then be recovered along with the higher hydrocarbons. For example, such a stream 30 might be reduced in pressure to about 800 psig and fed to the inlet 31 to a crossflow membrane filtration apparatus 33 with a previously wet spiral wound membrane cartridge, which apparatus has a retentate outlet 35 and a permeate outlet 37. A pressure regulator 39 at the retentate outlet might be set to maintain a backpressure of about 700 psig, and a pressurized collection tank 41 is connected to the outlet 37 downstream of the pressure regulator 39 to collect the liquid hydrocarbons. Alternatively, if only C3+ hydrocarbons were desired for collection, the backflow pressure regulator 39 might be set to maintain a pressure of about 170 psig and the inlet pressure to the apparatus could be dropped below about 200 psig. With the pressurized container set at about 150 psig, C3 and higher hydrocarbons would be collected. Depending on the particular composition of a petroleum gas stream, a flow of 100,000 cfm, carrying about 10-15 gpm liquids per 1,000 cfm, might produce more than 1,000 gallons of liquid hydrocarbons per hour.

Although the systems illustrated and the methods described may be most useful for effectively producing a pipeline quality natural gas stream from a high BTU NG stream obtained from a wellhead or the like, the system may also be employed elsewhere in NG production and in refinery operations, e.g. to effectively recover economically valuable light hydrocarbon condensates from any stream of mixed hydrocarbons having a significant content of NGLs or FGLs and/or to provide a methane stream with only minimal NGLs. Such a stream is notably desirable for pipeline transmission of NG where the compressors involved operate with lower maintenance, and also for gas turbine power production where incomplete combustion in the combustor often leads to expensive clean-up operations downstream of the gas turbine to meet EPA standards in the U.S. In this respect, the stream may be an NG stream previously treated to remove minute solids and $CO_2$, but which still contains significant amounts of NGLs or may be a petroleum gas stream that might otherwise be flared. Because of the relative simplicity and operation of this system (essentially no moving parts), it may now be economically feasible to remove and recover such light hydrocarbon condensates, on an economic basis, from a variety of natural gas streams and other sources. Although the invention has been described and illustrated with respect to the best mode known to the inventor at the present time, it should be understood that various modifications and changes might be made which would be obvious to one having ordinary skill in the art, and that such modifications would be considered as falling within the scope of the invention which is defined by the claims appended hereto.

Particular features of the invention are emphasized in the claims that follow.

What is claimed is:

1. A method for producing a pipeline quality natural gas (NG) stream from a NG stream with a BTU content greater than about 1100 BTU per standard cubic foot (scf), which method comprises:
   providing such a natural gas stream containing natural gas liquids (NGLs),
   providing a cross flow semipermeable membrane apparatus which has an inlet, a retentate outlet and a permeate outlet,
   wetting the semipermeable membrane in the cross flow membrane apparatus with an organic liquid to render the membrane oleophilic,
   delivering said stream at a pressure of at least about 150 psig (11.2 atm) to the inlet of the cross flow apparatus wherein said stream is exposed to said wetted oleophilic membrane, causing NGLs to permeate through said membrane,
   removing NG retentate from the retentate outlet of the apparatus as a primarily methane stream having a BTU content not greater than 1050 BTU/scf, and
   collecting permeating liquid NGLs exiting via the permeate outlet while maintaining a backpressure of at least 120 psig (9.2 atm) on the permeate outlet to preserve the oleophilic character of said wetted membrane.

2. The method of claim 1 wherein the permeate outlet is connected to a collection container and the pressure within the container is maintained at least about 15 psig (2 atm).

3. The method of claim 1 wherein the semipermeable membrane is a polymeric membrane.

4. The method of claim 1 wherein the membrane is a polymeric fluorocarbon.

5. The method of claim 4 wherein the membrane is a polyvinylidene difluoride (PVDF).

6. The method of claim 1 wherein the membrane is a polyimide, a polysulfone (PS or PES), a polyether ketone (PEK), or a polydimethylsiloxane (PDMS) on a PS base.

7. The method of claim 1 wherein the membrane is wetted with an organic liquid having a viscosity of not greater than about 2000 cps.

8. The method of claim 7 wherein the membrane is wetted with a hydrocarbon.

9. The method of claim 7 wherein the membrane is wetted with diesel fuel.

10. The method of claim 7 wherein the membrane is wetted with diesel fuel by feeding the diesel fuel into the inlet.

11. A method for removing natural gas liquids (NGLs) from a natural gas (NG) stream, which method comprises:
    providing such a natural gas stream containing NGLs, providing a cross flow semipermeable membrane apparatus which has an inlet, a retentate outlet and a permeate outlet, wetting the semipermeable membrane in the cross flow membrane apparatus with an organic liquid to render the membrane oleophilic, delivering said stream at an inlet pressure of at least about 150 psig (11.2 atm) to the inlet of the cross flow apparatus wherein said stream is exposed to said wetted oleophilic membrane, causing NGLs to permeate through said membrane, removing NG retentate from the retentate outlet of the apparatus as a primarily methane stream, and collecting permeating liquid NGLs exiting via the permeate outlet while maintaining a backpressure less than the inlet pressure of at least about 120 psig (9.2 atm) an the permeate outlet to preserve the oleophilic character of said wetted membrane.

\* \* \* \* \*